Jan. 4, 1955     T. C. POULTER     2,698,575
CHARGE FOR SEISMIC EXPLORATION
Filed July 2, 1949     3 Sheets-Sheet 1
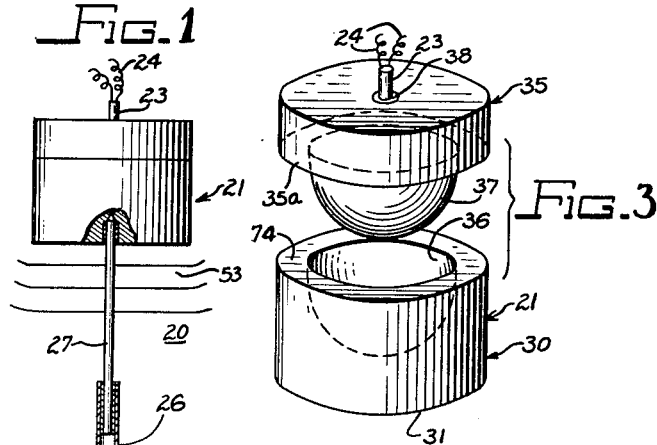
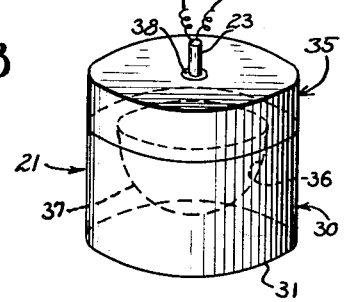
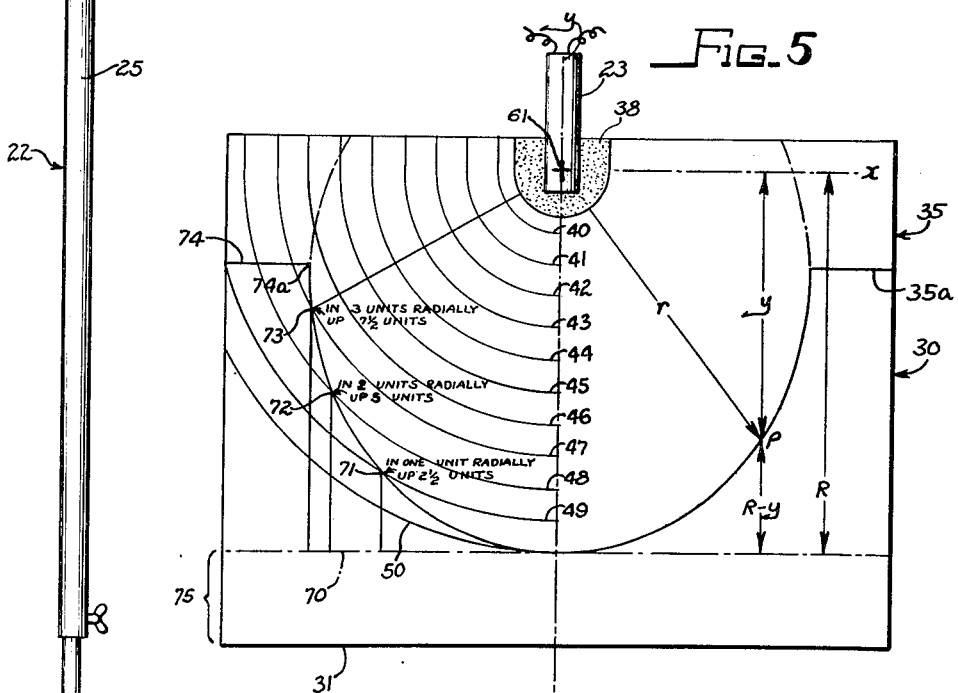
Inventor
Thomas C. Poulter
Carlson, Pitzner, Hubbard & Wolfe
Attys.

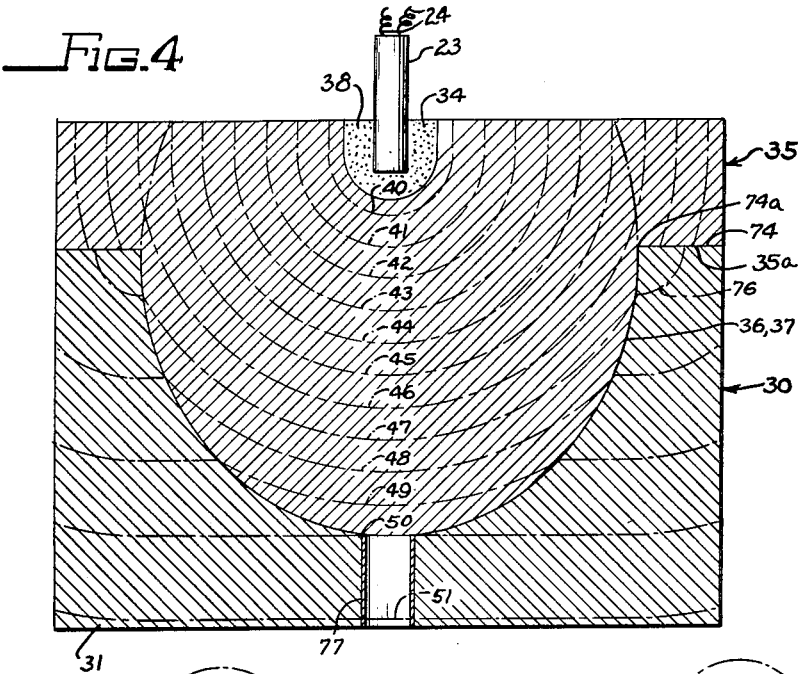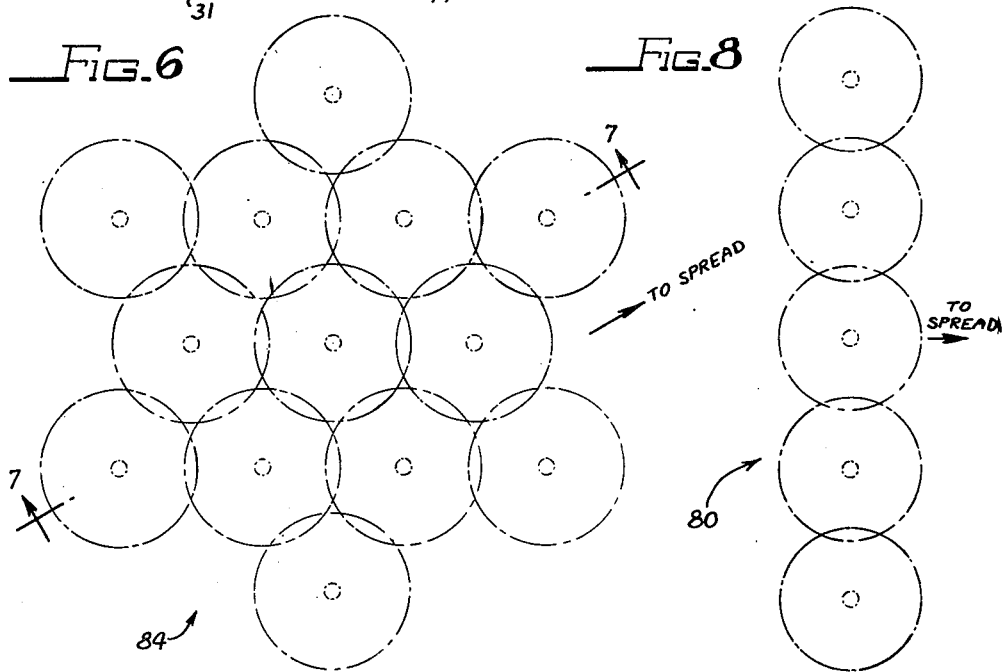

Jan. 4, 1955  T. C. POULTER  2,698,575
CHARGE FOR SEISMIC EXPLORATION
Filed July 2, 1949  3 Sheets-Sheet 3
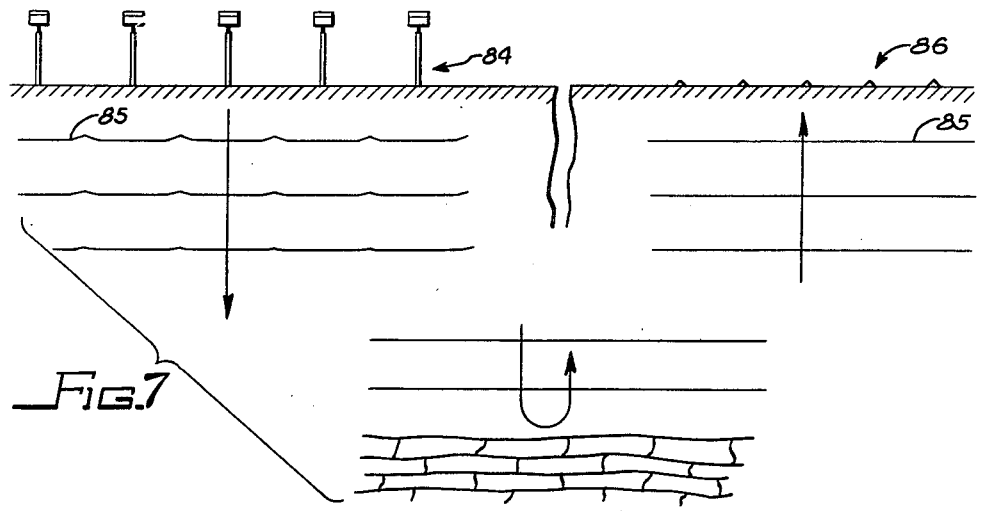
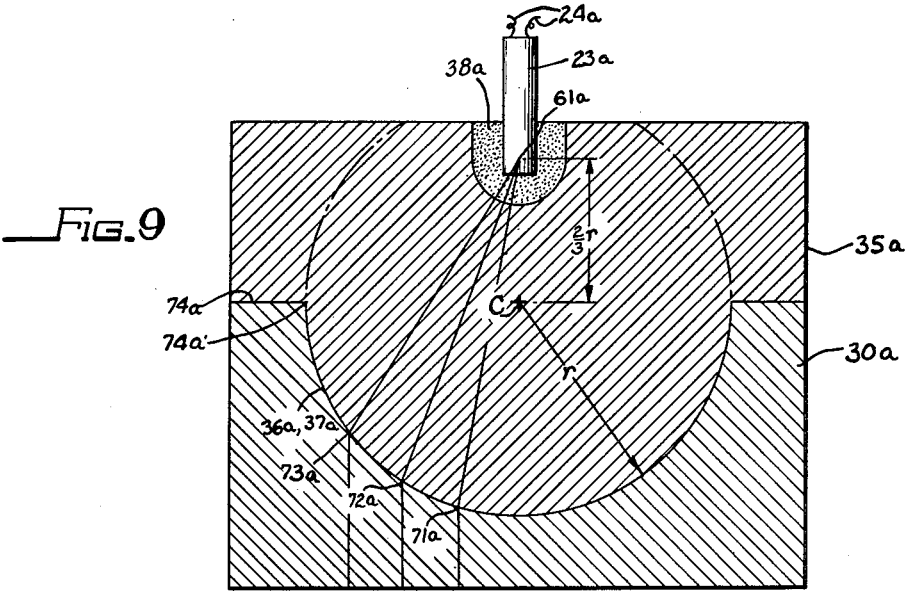
Inventor
Thomas C. Poulter
by:
Carlson, Pitzner, Hubbard & Wolfe
Attys.

United States Patent Office

2,698,575
Patented Jan. 4, 1955

2,698,575

CHARGE FOR SEISMIC EXPLORATION

Thomas C. Poulter, Palo Alto, Calif., assignor to Institute of Inventive Research, San Antonio, Tex., a trust estate Application July 2, 1949, Serial No. 102,824

3 Claims. (Cl. 102—24)

The present invention relates to geophysical exploration and more particularly to the formation of a directive explosive wave front for obtaining seismic reflections from submerged horizons. It is an object of the present invention to provide an improved explosive charge and procedure for using the same for producing a shock wave front which is applied flatly to the ground for penetration to deeply submerged layers. It is a more detailed object of the invention to provide a novel composite charge which includes different types of explosives so arranged that the wave emanating from the active surface proceeds flatly and with pronounced directive effect.

It is another object to provide an improved charge and method of use which enables a high intensity supersonic shock wave to be generated for application to the earth simultaneously over a relatively large area immediately followed by a more sustained pressure pulse.

It is a further object to provide an improved charge for producing seismic records in which the traces are well defined and easily interpreted using a total amount of explosive which is usually no greater and normally much less than conventionally required, even when operating in areas in which the obtaining of good seismic traces is known to be difficult.

It is still another object to provide an improved charge and procedure for using the same which causes a large portion of the explosive energy to be converted at an efficient level into a flat earth-borne wave without damage to the earth's surface and without hazard to property or personnel. Use of the techniques disclosed herein eliminates the necessity for drilling shot holes and enables a number of shots to be fired in quick succession at the same location for the production of identical traces or confirmatory traces for different filter settings.

It is still a further object to provide an air-fired charge which is readily transported and arranged for firing and which may be manufactured at a cost which is not appreciably greater than the cost of manufacturing conventional charges.

Other objects and advantages of the invention will become apparent as the discussion proceeds taken in connection with the accompanying drawings in which:

Figure 1 shows a preferred form of charge constructed in accordance with the present invention and mounted for firing.

Fig. 2 shows the charge of Fig. 1 in perspective.

Fig. 3 is an expanded view of the charge of Figs. 1 and 2.

Fig. 4 shows the propagation of the detonation wave front in the improved charge.

Fig. 5 is a geometrical construction for graphically determining the boundary between the portions of the charge.

Fig. 6 is a plan view showing a charge pattern with the active area of influence of each of the charges overlapping the active area of the adjacent charges.

Fig. 7 is a diagram showing the manner in which a merged flat wave front is generated at the shot point by the charge pattern of Fig. 6 and received at a geophone spread after reflection from a submerged horizon.

Fig. 8 shows an in-line arrangement of charges at the shot point.

Fig. 9 shows an alternative embodiment of the invention.

While the invention is susceptible of various alternative constructions and modes of use, I have shown in the drawings and will here describe in detail only certain preferred embodiments of the invention. It is to be understood, however, that I do not intend to limit the invention by such disclosure, but aim to cover all modifications and alternatives falling within the spirit and scope of the invention as expressed in the claims.

Turning now to Fig. 1, there is disclosed a charge assembly 20 having a vertically oriented charge 21 and a charge holder 22 for supporting the same elevated from the ground. Centered within the charge in the upper portion thereof is a blasting cap 23 which is connected by leads 24 to an appropriate firing device. The support 22 includes a tubular post 25 carrying a cardboard sleeve 26 at its upper end. Projecting upwardly from the sleeve is a thin dowel of wood 27 which may be up to a foot or more in length and which has a pointed upper end for insertion within the body of the charge 21.

It has been observed that a cylindrical charge of homogeneous explosive when fired from the upper end, produces a shock wave therein which travels down the length of the charge at supersonic velocity. The rate of propagation, known as the "detonation rate," is of a predetermined value for each of the commonly used types of explosives, ranging between 8,000 and 26,000 feet per second. Extremely high speed photographs show that the shock wave front travels so fast that it leaves the lower end of the charge before the violent disruption and release of gas associated with an explosion has a change to take place.

When the charge is fairly long, having a length to diameter ratio on the order of 8 or 10 to one, and when the lower end is trimmed off square, I have observed that the shock wave projected from the lower end is substantially flat and tends to proceed flatly into contact with the earth in much the same way as in the case of the wave projected from the flat charge covered in my application Ser. No. 29,307. Where a number of such charges are spaced quite closely together the effect is to produce a wave front in the earth which is a composite or resultant of the waves from all of the charges. It is found, however, that to obtain satisfactory flatness the charge must be quite long. On the other hand, to obtain sufficient area of the projected wave the charge must be of substantial thickness. The net effect is to require a total weight of explosive which is greater than that required in the present case.

I have found that a flat shock wave front may be produced with increased efficiency and by using a smaller charge of more conventional dimensions by employing in the same charge explosives of different rates of detonation related in a particular manner and by employing a mount which has no substantial retarding effect upon the wave.

As disclosed in Figs. 2 and 3 the charge 21 includes a base portion 30 which is of generally cylindrical shape and which preferably has a flat lower surface 31 together with a cap portion 35 of an explosive having an unlike detonation rate. The portion 30 has a concave hollow or cavity 36 formed therein which mates face to face with a convex protuberance 37 on the cap portion. When telescoped together as shown in Fig. 2 they form a composite and compact block of a high explosive. In accordance with the invention the interface 36, 37 between the explosives is of a curvature which is coordinated in a novel manner with the detonation rates and preferably symmetrical with respect to the axis of the charge. In order to insure that detonation takes place reliably and at a high order, the cap 23 is preferably surrounded by a booster charge 38.

In carrying out the invention, the cap portion is formed of explosive having a relatively low rate of detonation while the base portion has a higher rate of detonation, the ratio of the detonation rates preferably being on the order of 1:2 or 1:3. Explosives may be selected from a group including TNT, RDX, seismograph gelatin or the like. Referring to the sectional view of the charge of Fig. 4, the successive positions occupied by the shock wave front upon the firing of the cap 23 are indicated by the lines 40–50 inclusive. It will be seen that so long as the wave front is completely within the portion 35 of the charge, it will proceed radially outward from the point of detonation 61 in all directions. The wave front can therefore be represented in its initial stages by a series of concentric circles. Upon striking the interface 36, 37 however, the wave front speeds up and the peripheral portion, traveling through the higher velocity explosive 30, proceeds in an axial direction at a faster rate than the central portion. To state this in another way, the contour of the interface is such that the total time for the transmission of the wave front from the point of detonation through the slow explosive to a point on the interface, and thence in a direction parallel to the central axis of the charge through the fast explosive to the plane face of the charge is substantially the same for each point on the interface. Assuming that the interface is formed in the manner to be described, the resulting wave front will be substantially plane just prior to leaving the lower surface 31 of the charge as indicated at 51. The wave front is then projected into the air from the face 31 the successive positions being indicated by the lines 53 (Fig. 1).

Because of the relatively limited area of the face 31, the initial intensity of the flat wave front is extremely high. It has been found, however, that by mounting the charge 21 on the narrow, sharpened pin 27, the wave front remains substantially intact in this critical region. With the charge mounted a distance of from 5 to 15 feet or more above the ground, it might be expected that the lower face of the charge would have substantially the effect of a point charge. Surprisingly enough, I have found that the wave front 53 does not spread out spherically as it passes through the air; nor does it remain in a narrow beam. On the contrary, the indications are that it expands into a broad, substantially plane wave in the region lying generally under the charge, striking the earth flatly over an area which is many times the area of the end of the charge. Pressure measurements show the area under the charge which is subjected to a substantially plane wave to be on the order of 1400 times as great as the area of the charge. As indicated by corresponding pressure measurements, conventional block charges of the same weight when fired under similar circumstances do not exhibit this phenomenon.

Although the reason for the above is not fully appreciated, it may be readily verified by arranging a spread of detectors below the charge so connected as to produce a family of pressure-time curves. Using charges having a weight on the order of 5 to 20 pounds in a range of elevation of 5 to 15 feet, the flatness of the shock wave front is quite pronounced, although the charges may be placed somewhat higher than this, say 20 or 25 feet, without departing from the invention in its broader aspects. However, the advantages of the arrangement are not as great at elevations greatly exceeding 12 feet.

While the curvature of the interface 36, 37 may vary somewhat from that shown in Fig. 4 without sacrificing the primary advantages of the charge, nevertheless I have found it desirable to form the surface accurately in accordance with certain principles and relationships which will be set forth in the paragraphs which follow. It is believed that the procedure employed in the design of a practical charge will be informative to those desiring to practice my teachings. It will be understood, of course, that the disclosed charges may vary in size depending upon the job to be done and may also use a wide variety of explosives of known detonation rate. In general the detonation rate will range from 6000 or 8000 feet per second to about 26,000 feet per second.

Suppose that a composite charge is required having a total weight of approximately 5 pounds. Assuming an average density of explosive, this corresponds to a volume of approximately 80 cubic inches. It will next be assumed that a charge is desired which is in the shape of a right circular cylinder, the height being equal to, or preferably somewhat less than, the diameter. This condition may be met by a diameter of about 4.7 inches. Next, it will be understood that the available explosive materials which are to be used have detonation rates of 20,000 feet per second and 8,000 feet per second, respectively, giving a detonation velocity ratio of 2.5 to 1.

In the manufacture of a charge capable of producing a flat wave front and meeting the above conditions I prefer to construct the surface using graphic means. Referring to Fig. 5 the point of detonation 61 is chosen as the starting point and an arc 50 is struck off. The radius of the arc will establish the axial distance between the point of detonation and the interface. As a first estimate, it should be a little greater than one-half of the desired diameter of the final charge, say, three inches. The low point of the arc 50 determines a datum plane or reference level 70. Subsequently, other arcs 40–49 are struck off which are of progressively decreased radius with equal increments between them. In a practical case such increments could, for example, be one-quarter inch, giving a total of 12 units of distance between the center 61 and the arc 50. In order to determine the position of the next point used in defining the interface, attention is directed to the arc 49 which lies one unit radially inward from the reference level 70. A point 81 is located on this arc which lies upwardly from the level 70 at a distance which is equal to the unit distance multiplied by the ratio of the detonation rates in the two explosives. In the case at hand, the detonation velocity ratio was assumed to be 2.5. Thus, a point is chosen on the arc 49 which is above the level of the plane 70 by an amount two and a half times as great as the incremental distance between the arcs. The legend "in 1 unit radially, up 2½ units" applied to the point 71 illustrates a simple way of considering this construction.

Next, a second point on the interface, point 72 is located on the arc 48 which is displaced two units inwardly from the outer arc 50. Since we have proceeded two units inwardly, we must locate the point at a distance above the level 70 which is two and one half times this amount, in other words, five units. In exactly this same manner, a third point 73 is located which is three units in toward the center 61 and seven and one half units up from the plane 70. This technique may be used to locate still additional points, the smooth line connecting all these points then forming the contour of the interface 36, 37. It will be found that the resulting surface is an ellipsoid of revolution about the axis of the charge.

While it is possible for the low velocity portion of the charge to be a substantially complete ellipsoid by continuing the contour of the interface 36, 37 along the dot-dash extension thereof, the interface is preferably terminated at the region of maximum diameter. In the present instance, this is done by establishing an annular surface or ledge 74 on the lower portion 30 of the charge which is approximately one-half inch in radial extent. To make the charge perfectly cylindrical for easy packaging and convenient use, the upper portion 35 is provided with an integral flange 35a which overlies the annular ledge 74. This insures also that the interface is totally enclosed to lessen the chance of deformation particularly when plastic explosives are used. It has also been found that the composite charge is less subject to damage of one sort or another and produces more consistent results if the thickness of the lower portion is increased a half inch or more as indicated at 75. This has no adverse effect on the plane nature of the wave and the thickness may be still further increased to add to the weight and potency of the charge if desired.

As a result of the above there is produced a composite charge having a diameter of five and one quarter inches and a height of approximately 4 inches, the total volume of the charge being approximately 86 cubic inches. Because of the discontinuity introduced by the annular surface 74 and particularly the abrupt inner edge 74a thereof, the wave front as it begins its travel will not be perfectly flattened but will be curved at its edges as indicated at 76. Considering the point 74a as the center, however, it will be noted that the curvature of the fringe portion will gradually become less and less as the wave front advances downwardly through the charge. By the time that the wave front has progressed to the face of the charge, the entire wave front (see 51) is substantially plane.

The action of the interface 36, 37 in producing a flat wave front may be readily verified by checking the time required for the wave front to reach various points along the reference surface 70. Along the axis of the charge, the time required is 12 units. Referring to point 71 in the interface, the time required for propagation in the low velocity explosive is 11 units since this point is located one unit closer to the detonation point 61. From the point 71 the wave must travel 2.5 units to reach the surface 70; however, since the wave travels 2.5 times as fast in the second explosive medium, this will only take one unit of time, making a total of 12. This verification may be repeated for the points 72 or 73 or for any intervening points.

While it is entirely adequate to use graphical means for determining the contour of the interface, the curvature relationship may, if desired, be mathematically verified. For this purpose reference is made to the right-hand portion of Fig. 5 which includes a pair of coordinate X and Y axes with the detonation point 61 assumed to be at the origin. A reference level 70 is chosen at a distance R from the X axis and a point P is assumed to lie anywhere on the desired interface at a distance $r$ from the origin. The interface divides the upper medium having a velocity $V_1$ from the lower medium having a higher velocity $V_2$.

In accordance with the main premise, the time required for a wave front emanating from the point 61 to reach the reference level is a constant K at all points therealong. Thus $$\frac{r}{V_1} + \frac{R-y}{V_2} = K$$

Knowing the boundary condition that when $r=R$, $y=R$, then $$\frac{R}{V_1} + \frac{R-R}{V_2} = K$$

or $$K = \frac{R}{V_1}$$

Substituting for K in (1) gives $$\frac{r}{V_1} + \frac{R-y}{V_2} = \frac{R}{V_1}$$

Solving for y gives $$y = R - \frac{V_2}{V_1}(R-r)$$

This defines the contour of the surface since R, $V_2$, and $V_1$ are all known. The surface itself is one of revolution about the centrally located y axis. Using the above expression the two halves of the charge may be accurately molded and then fitted together.

It can be shown that the curve defined by the above expression is an ellipse with the point of detonation 61 at the upper focus. The interface itself is therefore an ellipsoid of revolution about the vertical or major axis. The eccentricity of the ellipse is $$\frac{V_1}{V_2}$$

In employing the charge as shown in Fig. 1 I prefer to arrange a plurality of charges equally spaced from one another in a pattern with all of the charges at substantially the same elevation. A pattern of 13 charges is shown by way of example in Fig. 6, and indicated generally at 84, the charges being spaced from one another by an amount such that their effective areas are caused to overlap. By firing the charges at precisely the same instant, the individual wave fronts are caused to merge with one another so that a single flat wave front 85 is produced. Fig. 7 shows the pattern 84 in elevation, the merged or composite wave front 85 being indicated in successive positions progressing downwardly toward a reflecting horizon. The wave front after being reflected from such a horizon and upon arrival at the surface of the earth is shown in the right-hand portion of Fig. 7. The geophone spread is here indicated schematically at 86 and it will be understood that conventional geophones and recording equipment may be used. Under certain conditions it will be found possible to obtain clear reflections using a pattern of less than 13 charges. For example, an in-line pattern 80 as set forth in Fig. 8 has worked out successfully, especially when the line of charges is arranged broadside to the geophone spread. The charge is suitable both for reflection shooting and refraction shooting. Even if no special pattern is employed records may be obtained which are much more clear and easily interpreted than records obtained by conventional shooting and are capable under many conditions of producing results which are better than those obtained using other types of air-fired charges.

It has been found that the present charge is particularly suited for obtaining seismic traces in regions where the characteristic frequency most readily transmitted by the earth is rather high, say on the order of 50 cycles per second. My observations would indicate that this is due to the rather sudden and positive manner in which the earth is placed in motion by the initial portion of the wave.

While I prefer to employ an interface between the explosives which is an ellipsoid of revolution, I have found that satisfactory results may also be obtained by making the interface spherical and by displacing the point of firing from the center of the sphere by an amount which is related to the detonation rates of the two explosives. An example of such an arrangement is set forth in Fig. 9 which shows a cross section of a charge similar to Fig. 4. The same reference numbers are used where applicable with a subscript $a$. In Fig. 9 the interface 36a, 37a has a radius $r$ and a center C. It is assumed that the ratio of the detonation rates of the two explosives is 2½:1 just in the case of the example set forth above. In carrying out the invention, the point of detonation 61a is displaced above the center C an amount such that the detonation wave front projected from the lower surface of the charge is substantially flat. Where the detonation ratio is 2½:1, this can be accomplished by spacing the point of detonation above the center of the interface an amount substantially equal to two-thirds of the radius of the spherical surface. That this produces a relatively flat projected wave front may be readily demonstrated by one skilled in the art by considering the time required for the detonation to proceed from the primer to the face of the charge via points 71a, 72a and 73a, respectively.

It has further been found that where the ratio of the detonation rates differs from the ratio used above, the upward displacement of the detonation point from the center curvature becomes increasingly less. The preferred values of displacement are set forth in the following table:

| Detonation rate | Displacement of detonation point |
| --- | --- |
| 1:1 | ∞ |
| 2:1 | 1 (r) |
| 3:1 | ½ (r) |
| 4:1 | ⅓ (r) |
| 5:1 | ¼ (r) |
| 6:1 | ⅙ (r) |

The above table includes the ratios which will be encountered in the practical case, and displacements corresponding to intermediate ratios may readily be determined by interpolation. It will be apparent to one skilled in the art that the invention is not to be considered limited to the use of an interface of elliptical or spherical section but would also include composite charges which depart therefrom to a greater or lesser extent and where compensation is effected by suitable alteration of the lower surface of the charge so that a substantially flat wave is projected into the air therefrom.

The present charge in any embodiment thereof makes valuable use of air transmission of the wave for distributing its energy flatly over a large area. In spite of the high intensity of the shock wave at its source the wave is reduced in intensity by the elastic nature of the air and distributed over a considerable area of the ground. At the instant of contact with the earth, the energy level is at such level that transfer of energy to the earth takes place with high efficiency. Further, since the energy of the wave is distributed over a large area at low amplitude, the loose granular overburden or weathered layer may be penetrated without severe attenuation. Once this layer is passed, sufficient energy remains in the wave front to enable it to penetrate to great depths and to persist at reliable recording intensities until the surface of the earth is again reached at the end of the reflection path.

Unlike charges fired in the earth, the nature of the earth is not changed with each shot and confirmatory traces may be fired in quick succession. The support 22 arranged axially below the charge is subjected to balanced forces during the firing and is not disturbed. It is merely necessary to replace the wooden dowel 27 and the associated paper tube support before impaling the next charge.

There is practically no damage to the surface of the earth and only insignificant damage to vegetation. It is not necessary to clear brush prior to firing and, except for the setting of the supporting stakes, no preparation of the terrain is required. Practical field tests have demonstrated that there is substantially no danger to personnel even at close range. The shock wave is, for the most part, directed downwardly and no missiles are thrown laterally. The fire hazard is likewise insignificant since the charge is completely disintegrated and no portions of the charge assembly are sufficiently large or sufficiently hot to ignite dry grass.

It has been found that the merged wave front is sufficiently concentrated so that reflected impulses are normally received from a relatively small section of a submerged horizon. This makes it possible to make a very detailed logging of the submerged strata.

The method and charge presently disclosed produce essentially no ground roll problems. In addition, it is readily possible to remove the shot point from the geophone spread by a horizontal distance great enough as compared to the vertical elevation of the charge so that the reflected energy reaches the geophone spread before the air wave does. Consequently, first arrivals are of very low amplitude and the automatic volume control or the expander circuit can easily handle the full range of energy level. No preset suppressor is required and the early parts of the record are left free from the usual distortion caused by tripping the suppressor. As a result cleancut reflections and refractions usually appear very early on the record.

Due to the small amount of energy imparted to the earth over each unit area, the present explosive charges and procedures for employing the same have a very practical application in taking soundings over bodies of water. To support the charge the desired distance above the water's surface, it will be apparent that any desired type of floating frame or buoy may be used. Tests have indicated that charges of 20 pounds or even several times this amount may be fired without danger or damage to fish or other marine life.

I claim as my invention:

1. A composite explosive charge for producing a shock wave front having improved directional properties comprising, in combination, a body of explosive of high detonation rate having an extensive flat face on the lower side thereof and a concave recess symmetrically formed on the opposite side about a central longitudinal axis, a body of explosive of relatively slower detonation rate having a convex protuberance formed thereon symmetrically about said central longitudinal axis for close fitting reception within said recess and having provision for detonating the same from an axially arranged point of detonation, the contour of the interface between said bodies of explosive being substantially defined by the following relation:

$$y = R\frac{V_2}{V_1}(R-r)$$

where R is the axial distance between the detonation point and the interface, measured along said central axis, $$\frac{V_2}{V_1}$$

is the ratio of said high detonation rate to said slower detonation rate in the respective bodies of explosive, and y and r are the longitudinal and radial distances, respectively, from the detonation point to a point on said interface so that a substantially plane shock wave is propagated from said extensive flat face upon detonation of the charge.

2. A composite explosive charge for producing a shock wave front having improved directional properties comprising, in combination, a body of explosive of high detonation rate having an extensive substantially flat face on one side thereof and an ellipsoidal recess symmetrically formed on the opposite side about a central axis, an upper body of explosive of relatively slower detonation rate having an ellipsoidal protuberance formed thereon with said central axis comprising the major axis thereof for close fitting reception within said recess and having provision for detonating the same from an axially arranged point of detonation, the contour of the interface between said bodies of explosive being substantially defined by the following relation:

$$y = R - \frac{V_2}{V_1}(R-r)$$

where R is the axial distance between the detonation point and the interface, measured along said central axis, $$\frac{V_2}{V_1}$$

is the ratio of said high detonation rate to said slower detonation rate in the respective bodies of explosive, and y and r are the longitudinal and radial distances, respectively, from the detonation point to a point on said interface so that a substantially plane shock wave is propagated from said extensive flat face upon detonation of the charge, the recess in said lower body of explosive being bounded by an annular ledge and said upper body of explosive having a flange extending radially outward therefrom for face-to-face engagement with said ledge.

3. A composite explosive charge for producing a shock wave front having improved directional properties comprising, in combination, a body of explosive of high detonation rate having an extensive plane face on the lower side thereof and a concave recess symmetrically formed on the opposite side about a central longitudinal axis, a body of explosive of relatively slower detonation rate having a convex protuberance formed thereon for close fitting reception within said recess and having means for detonating the same from an axially arranged point of detonation, the contour of the interface between said bodies of explosive being such that the total time taken for transmission of the detonation wave from the detonating means through the slower explosive to a point on the interface and thence in a direction parallel to said axis through said fast explosive to the plane face is substantially the same for each point on the interface to produce a substantially plane detonation wave at the plane face.

References Cited in the file of this patent

UNITED STATES PATENTS

| | | |
|---|---|---|
| Re. 17,242 | McCollum | June 5, 1928 |
| 2,203,140 | Green | June 4, 1940 |
| 2,340,314 | Farnham | Feb. 1, 1944 |
| 2,426,997 | Gray | Sept. 9, 1947 |
| 2,487,317 | Davidson | Nov. 8, 1949 |
| 2,601,522 | Heiland et al. | June 24, 1952 |

FOREIGN PATENTS

| | | |
|---|---|---|
| 11,030 | Germany | Nov. 11, 1880 |

OTHER REFERENCES

Davis: The Chemistry of Powder and Explosives, vol. II, John Wiley & Sons, Inc., N. Y. C. (1943); pages 412, 418, 434, 452.